(12) United States Patent
Rotter et al.

(10) Patent No.: US 6,406,766 B1
(45) Date of Patent: Jun. 18, 2002

(54) ACTIVE OXYGEN SCAVENGER PACKAGING

(75) Inventors: George E. Rotter, Naperville; Paul J. Cahill; Tamila J. Barnes, both of DuPage; Charles W. Bauer, Kane; David C. Johnson, Naperville; Matthew A. Kulzick; Tsuei-Yun Lynch, both of DuPage; Walter M. Nyderek, Cook, all of IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/219,178

(22) Filed: Dec. 22, 1998

Related U.S. Application Data

(63) Continuation of application No. 08/717,370, filed on Sep. 23, 1996, now Pat. No. 6,083,585, and a continuation-in-part of application No. PCT/US97/16712, filed on Sep. 22, 1997, and a continuation-in-part of application No. PCT/US98/02991, filed on Feb. 17, 1998, and a continuation-in-part of application No. PCT/US98/05239, filed on Mar. 17, 1998.

(51) Int. Cl.$^7$ .............................................. B29D 22/00
(52) U.S. Cl. ...................................... 428/35.7; 528/502
(58) Field of Search ....................................... 428/35.7

(56) References Cited

U.S. PATENT DOCUMENTS

| | | | | |
|---|---|---|---|---|
| 3,553,157 A | | 1/1971 | Dijkstra et al. ............... 260/40 |
| 4,049,750 A | * | 9/1977 | Brenner ...................... 260/864 |
| 4,145,466 A | | 3/1979 | Leslie et al. ................... 428/35 |
| 4,713,428 A | * | 12/1987 | Mulhaupt .................... 525/523 |
| 4,938,831 A | * | 7/1990 | Wolf ....................... 156/275.3 |
| 4,970,033 A | * | 11/1990 | DeGiovanni ................. 264/22 |
| 4,970,262 A | * | 11/1990 | Westeppe .................... 525/66 |
| 5,047,485 A | * | 9/1991 | DeNicola .................... 525/387 |
| 5,075,344 A | * | 12/1991 | Johnson ....................... 521/40 |
| 5,194,489 A | * | 3/1993 | Frances ...................... 524/731 |
| 5,216,088 A | * | 6/1993 | Cinadr ........................ 515/356 |
| 5,234,644 A | * | 8/1993 | Schutze ...................... 264/101 |
| 5,239,016 A | * | 8/1993 | Cochran ..................... 525/371 |
| 5,280,059 A | * | 1/1994 | Chamberlain ............... 524/147 |
| 5,484,882 A | * | 1/1996 | Takada ........................ 528/361 |
| 5,817,707 A | * | 10/1998 | DeNicola .................... 522/157 |
| 5,820,981 A | * | 10/1998 | Williams .................... 428/364 |
| 5,859,173 A | * | 1/1999 | Schumann .................. 528/271 |
| 5,919,871 A | * | 7/1999 | Nicol ....................... 525/333.8 |
| 6,017,975 A | * | 1/2000 | Saum ......................... 522/161 |
| 6,083,585 A | * | 7/2000 | Cahill ........................ 428/35.7 |

\* cited by examiner

Primary Examiner—Paul R. Michl
(74) Attorney, Agent, or Firm—Joseph DiSalvo

(57) ABSTRACT

Improved active oxygen scavenging packaging articles optionally further comprising $SiO_2$ and/or EAA coatings are disclosed. Also improved active oxygen scavenging copolycondensates and their use in packaging articles are disclosed. Specifically disclosed are (1) the use of an oxidation moderator or controller (anti-oxidant) along with the copolycondensate scavenger and (2) post polymerization treatment of the copolycondensate substantially in the absence of oxygen. The improvements lead to increased oxygen consumption by the active oxygen scavenger and improved packaging characteristics for the active oxygen scavenging copolycondensates.

10 Claims, 2 Drawing Sheets

PREFERRED BOTTLE WALL AND FILM CONSTRUCTION CROSS SECTION

US 6,406,766 B1

ACTIVE OXYGEN SCAVENGER PACKAGING

RELATIONSHIP TO PRIOR APPLICATIONS

This application is a continuation in part of a U.S. application filed on Sep. 23, 1996 having Ser. No. 08/717,370 now U.S. Pat. No. 6,083,585. It is also a continuation in part of three PCT applications filed as follows: (1) on Sep. 22, 1997 having Application No. PCT/US97/16712 published on Mar. 26, 1998 as WO 98/12127; (2) on Feb. 17, 1998 having Application No. PCT/US98/02991; published as WO 99/15432 on Apr. 1, 1999 and (3) on Mar. 17, 1998 having Application No. PCT1US98/05239 published as WO 99/15433 on Apr. 1, 1999.

STATEMENT REGARDING FEDERALLY FUNDED RESEARCH (Not Applicable)

FIELD OF THE INVENTION

The invention generally relates to copolymer compositions having active oxygen scavenging capacity and the use of these compositions for improved packaging of oxygen sensitive substances. Improved formulations are disclosed which may be fabricated into packaging articles. Also disclosed are improved packaging article constructions and embodiments.

BACKGROUND OF THE INVENTION

This application and the related applications, as recited above, are generally directed to active oxygen scavenging copolymers and their use in packaging articles. Most embodiments disclosed in this and the related applications involve the use of the active oxygen scavenging copolymers in a laminar composite as at least one of several layers comprising the wall or film of a packaging article.

The active oxygen scavenging copolymers of this and the related applications are typically copolycondensates comprising predominantly polycondensate segments and a lesser amount of oxygen scavenging moiety (OSM) segments. It is a common practice to use copolymers, more specifically copolycondensates, as packaging and bottling materials, For example, even common polyethylene terephthalate (PET) bottles used for bottling soda pop often comprise some isophthalic linkages in the polymer and thus could be called a copolymer. In order to avoid such ambiguities, the term oxygen scavenging copolymer or modified copolymer will be used to designate those polymers which have OSM segments and which are an important component of this invention. The oxygen scavenging modified copolymers of this invention are prepared as thermoplastics in that they are suitable for melt processing into bottles and packaging articles. However, applications for these materials are envisioned where the thermoplastic material may subsequently be transformed into a thermoset resin.

It is known that post polymerization treatment of modified packaging and bottling polycondensates (i.e., those which have not been modified so as to add oxygen scavenging ability) may generally improve the salient packaging characteristics of such materials. The post polymerization treatment may involve heat and/or chill treatment, chemical treatment/reaction, irradiation, aging, or combinations thereof. A non-exhaustive list of improvements which may be realized includes devolatization, drying, increased crystallization, further polymerization (especially solid state polymerization), increased intrinsic viscosity (IV), increased molecular weights, improved odor and/or taste, improved passive barrier properties, and improved clarity. The application of post polymerization treatment techniques to unmodified polycondensate to obtain such improvement is relatively well known in the art. Application of these post polymerization techniques to active oxygen scavenging copolymers in a manner similar to the techniques used on unmodified polycondensates has here-to-fore proven unsatisfactory because of problems encountered such as loss of oxygen scavenging capacity and discoloration or loss of clarity of the oxygen scavenging copolymers. What is needed are methods for post polymerization treatment of oxygen scavenging copolymers which provide the desired improvements gained for unmodified polycondensates but which avoid the problems previously encountered for post polymerization treatment of oxygen scavenging copolymers. This application addresses these and other needs leading to improved active oxygen scavenging copolymers and packaging articles made therefrom.

INVENTION SUMMARY AND REVIEW OF PRIOR ART

For more complete understanding of this and the related applications, it should be recognized that there are two broad types of barriers for shielding packaged oxygen sensitive substances from oxygen (generally oxygen from air). One is known as a passive oxygen barrier and finds utility because of superior resistance to the permeation of oxygen through such constructions. Glass and metal are essentially perfect passive oxygen barriers. Condensation polymers, especially polyesters such as polyethylene terephthalate (PET), have found wide acceptance in the packaging industry and are moderately good passive oxygen barriers. Other condensation polymers may exhibit either superior or inferior passive barrier properties than those of polyesters. For example, polyamides, such as polyhexamethylene adipamide and polyphthalamides, are generally better passive oxygen barriers than polyesters when deployed in similar constructions.

The other type of oxygen barrier is known as an active oxygen barrier. An active oxygen barrier is a substance capable of intercepting and scavenging oxygen (by undergoing chemical reaction with the oxygen), for example, as the oxygen attempts to permeate through the packaging. A major salient feature of active oxygen scavengers is their ability not only to intercept oxygen from air as it attempts to reach the package cavity but also to provide the means to eliminate unwanted oxygen (often called head space oxygen) from within the package cavity wherein said oxygen may have been inadvertently introduced during packaging or filling. Only active oxygen scavengers can remove unwanted oxygen from the package cavity. Active oxygen scavenging implies, therefore, transformation of a material incorporated in the package as it reacts with and depletes oxygen. The material is progressively consumed so that the active oxygen scavenging ability is eventually depleted or at least diminished. However, this eventual depletion of the active oxygen scavenging moiety can be adjusted so that the depletion occurs only well after the required oxygen free shelf life of the packaged product which is typically one year or less.

The active oxygen scavenging copolymers of this and the related applications are typically copolycondensates comprising predominantly polycondensate segments and a lesser amount of oxygen scavenging moiety (OSM) segments. Predominantly, as used above, means over 50 wt % of the copolymer is comprised of polycondensate segments. Comprising as used in this application is defined as "specifying the presence of stated features, integers, steps, or components as recited, but not precluding the presence or addition of one or more other steps, components, or groups thereof". Comprising is different from "consisting of" which does preclude the presence or addition of one or more other steps, components, or groups thereof. The polycondensate segments of the oxygen copolymers are typically polyester (especially comprising PET) or polyamide, but polysulfones, polyethers, polyketones and other polycondensates are also envisioned as sources of polycondensate segments for the oxygen scavenging copolymers of this application. The OSM segments of the oxygen scavenging copolymers are typically polyolefin oligomers, polypropylene oxide oligomers, or methyl pendant aromatic compounds as defined in the related application having Application Number PCT/US98/05239. The wt % of OSM segments employed in the copolymers is usually in the range of about 0.5 to 12 wt % and preferably in the range of about 2 to about 8 wt %. The copolymers may be produced by any means but are typically made by placing terminal functional group(s) on the OSM which are capable of entering into polycondensation, transesterification, transmigration, and similar transfer reactions. The required amount of these functionalized OSM's are then used as a "pseudo monomer" in a batch or continuous polycondensation or reacted with a previously prepared polycondensate where they are incorporated into the polymer by transesterification thus producing the active oxygen scavenging copolymer.

In selected applications, such as for packaging non-comestible products such as electronic components, the oxygen scavenging copolymers may be deployed as a single layer of film to form the packaging article. More often, the oxygen scavenging copolymer comprises at least one layer of a multi-layered packaging article. In many embodiments, at least one of the other layers comprises a packaging polycondensate such as a polyester or polyamide. The packaging polycondensate layer may be comprised of a mixture of monomers which may add salient packaging features to the layer. For example, in a layer of packaging polyester, it is typical to find PET having some linkages present other than ethylene and terephthalate. Typically the PET layer would contain some isophthalate and/or some naphthalate linkages, for example. These same linkages may also be present in the polyester blocks of the copolycondensate when the oxygen scavenging copolymer is a copolyester.

The oxygen scavenging copolymers are often used with and/or further comprise materials which improve their packaging properties and/or which enhance their active oxygen scavenging ability. Ideally, the following characteristics are considered to be desirable for the oxygen scavenging copolymers:

(1). Glass transition temperatures above about 60° C. are preferred so that the copolymers exist as solids at ambient temperatures of about 0 to 60° C.

(2). Intrinsic viscosity (IV) of at least about 0.5 is preferred for easier processing into bottles and/or films.

(3). Good clarity is preferred for clear packaging applications.

(4). Commercially acceptable scavenging capacity of at least 0.4 cc of $O_2$ per gram of copolymer at ambient temperatures is preferred to ensure adequate shelf-life of packaged product with minimal use of copolymer.

(5). Low OSM segment percentages (2 to 8 wt %) are preferred so that used packaging articles may be more readily recycled and so that the modified polymer is similar in properties to the unmodified polycondensate from which the polycondensate segments were derived.

(6). Good passive barrier properties are preferred not only to keep out $O_2$ but also to retain $CO_2$ in packaging of carbonated beverages.

The selected use of these enhancing materials includes pyromellitic dianhydride (PMDA), transition metal catalysts (preferably cobalt), photo-active substances such a benzophenone, oxidation moderators or controllers such as butylated hydroxy toluene (BHT), and others. Applicants have further determined that cobalt derived from cobalt carboxylates is most effective. Cobalt from cobalt octoate or cobalt stearate is preferred, and cobalt from cobalt octoate is especially preferred. The enhancing materials may be deployed individually or in various combinations. These enhancing material additives may comprise a portion of the copolymer composition during formation of the copolymer, may be added later to either the modified polymer or the packaging article, or some of the enhancing materials may be added by each of the methods.

The oxygen scavenging modified polymers are typically used as layers in a multi-layered wall/film packaging article. An especially preferred embodiment comprises use of the copolymer in conjunction with layers of polycondensate from which the polycondensate segments in the copolymer were derived.

It is known that post polymerization treatment of packaging and bottling polycondensates may generally improve the salient packaging characteristics of such materials. The post polymerization treatment may involve heat and/or chill treatment, chemical treatment/reaction, irradiation, aging, or combinations thereof. A non-exhaustive list of improvements which may be realized includes devolatization, drying, increased crystallization, improved (higher temperature) melt strength, further polymerization (especially solid state polymerization), increased intrinsic viscosity (IV), increased molecular weights, improved odor and/or taste properties, improved passive barrier properties, and improved clarity. The application of post polymerization treatment techniques to unmodified polycondensate to obtain such improvement is relatively well known in the art. Application of these post polymerization techniques to active oxygen scavenging copolymers in a manner similar to the techniques used on unmodified polycondensates has here-to-fore proven unsatisfactory because of problems encountered such as loss of oxygen scavenging capacity and discoloration or loss of clarity of the oxygen scavenging copolymers.

An early patent which discloses development of advantageous packaging properties for PET by post polymerization treatment is U.S. Pat. No. 3,553,157 of Dijkstra et al. The Dijkstra patent discloses both heat treatment and chemical treatment of PET. One chemical treating agent exemplified, among several disclosed in the Dijkstra patent, is PMDA. In a preferred embodiment of this application, Applicants disclose oxygen scavenging copolymer formulations comprising PMDA which is added during formation of the copolymer or is already present in a pre-formulated concentrate mix and serves as a chain extending agent. While there may be some residual PMDA remaining from its use during formation of the oxygen scavenging modified polymers of this invention, those of ordinary skill in the art will recognize that formulation of PMDA into the copolymer during synthesis is different from post polymerization treatment with PMDA. This is especially the case since PMDA is preferred because it essentially reacts to completion. Regardless, there is no disclosure what-so-ever in the Dijkstra patent regarding post polymerization treatment of oxygen scavenging copolyesters.

Another patent, U.S. Pat. No. 4,145,466 of Leslie et al. discloses the use of PMDA and PMDA derivatives in the post polymerization processing of PET primarily for improvement of melt strength of the PET. Again, there is no disclosure what-so-ever in this reference regarding post polymerization treatment of oxygen scavenging copolyesters. Two other patents, U.S. Pat. No. 5,243,020 and U.S. Pat. No. 5,338,808 both by Guido Ghilsolfi, describe the post polymerization upgrading of PET and PET-like polyesters but do not disclose methods for post polymerization upgrading of active oxygen scavenging copolyesters.

The active oxygen scavenging copolycondensates of this and the related applications are comprised predominantly of polycondensate segments and a lesser amount of OSM segments. When placed in the walls of packaging materials such as bottles, cups, films, trays, etc., oxygen attack on the packaged contents may be eliminated or at least held to acceptable levels for the required shelf life of the product. The capacity to absorb oxygen and the rate of such oxygen scavenging are key performance characteristics of the oxygen scavenging copolycondensates. The copolycondensates can be placed into container walls by a variety of melt processing methods as was disclosed in PCT Application PCT/US97/16711 published on Mar. 26, 1998 having International Publication Number WO 98/12127. The oxygen scavenging copolycondensates typically undergo post polymerization treatment prior to fabrication into containers to facilitate such processing and to improve the performance of the fabricated article. The oxygen scavenging modified polymers of this invention may also undergo post polymerization treatment after fabrication into containers/packages. These operations include, among others, drying, devolatization, crystallization, and solid state polymerization. In general, they are similar to those typically applied to non-oxygen scavenging homopolymers and copolymers. However, the application of such post polymerization techniques to oxygen scavenging copolymers here-to-fore has substantially diminished the oxygen scavenging capacity of such copolymers. One key feature of this invention was the identification and implementation of critical changes in these operations such that the oxygen scavenging capacity of the copolymers was not significantly diminished. An important concept of this invention was the discovery and perfection of methods to perform such operations in the strict absence of oxygen and to limit the copolymer oxygen exposure after such operations.

DETAILED DESCRIPTION OF THE INVENTION

Figure 1:
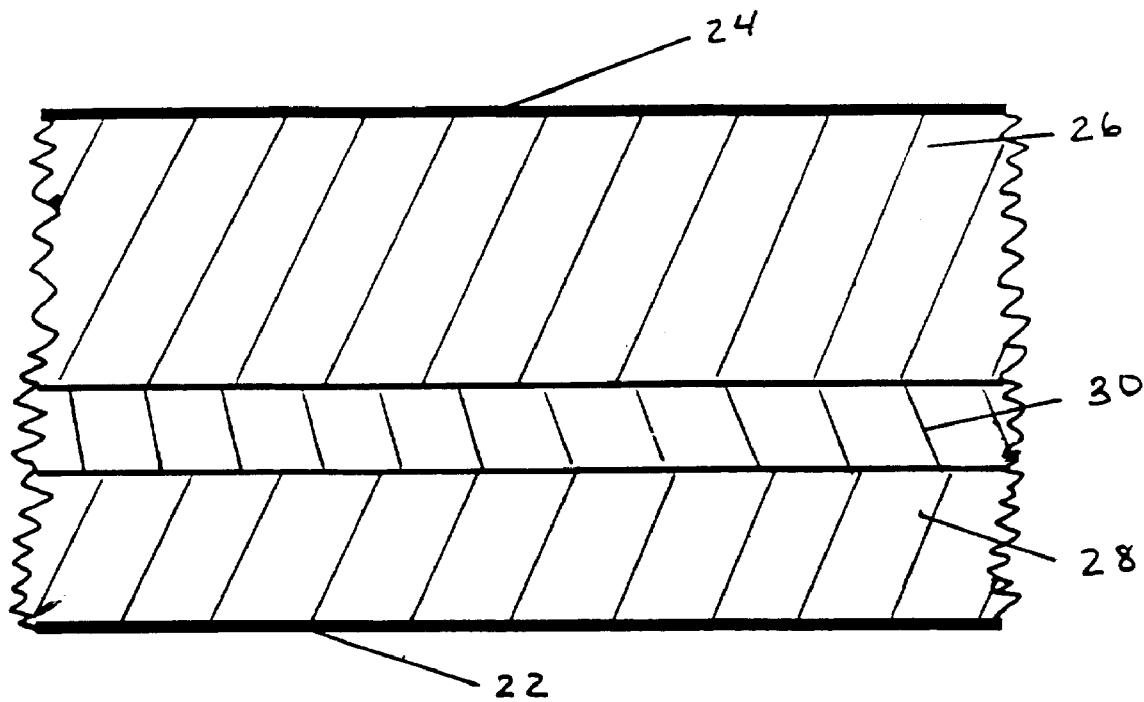
FIG. 1 is a cross sectional view of a preferred oxygen scavenging bottle wall and film construction.

The active oxygen scavenging modified polymers of this invention are typically copolycondensates comprising predominantly polycondensate segments and a lesser amount of oxygen scavenging moiety (OSM) segments. The preferred polycondensate segments are those derived from polyesters and polyamides. Especially preferred are packaging polyesters segments selected, e.g., from those as encompassed in USA 21 CFR § 177.1590 (revised April, 1997 edition). The OSM segments of the oxygen scavenging copolymers are first at least singly functionally terminated with a group capable of entering into polycondensation polymerization and/or capable of transesterification reaction with a previously formed polycondensate. The functionally terminated OSM's are as depicted by Formula 1.

X—(OSM)—Y                    Formula 1.

Double functionality is shown in Formula 1 as one possibility but the OSM may be singly functionally terminated or functionalized to a degree greater than two. Those of ordinary skill in the art will recognize that the commercial availability of functionally terminated OSM species will obviate the need to add such functionalization. In Formula 1, OSM represents an organic oxygen scavenging moiety, i.e., a chemical substance capable of reacting with and consuming/removing oxygen. Preferred OSM's include polyolefin oligomers of molecular weight 100 to 10,000, polypropylene oxide oligomers, or methyl pendant aromatic compounds as defined in the application having Application Number PCT/US98/05239. Applicants have found that the polybutadiene monomer itself, when incorporated as segments in a modified polymer, serves as a suitable OSM. However, especially preferred is the unhydrogenated polybutadiene oligomer of MW 100–10,000. In Formula 1, X and Y are typically the same and may be any species capable of entering into polycondensation and/or transesterification. A non-limiting list of possible species represented by X or Y includes OH, COOH, and $NH_2$, and substituted derivatives thereof capable of entering into polycondensation and/or transesterification reactions.

The modified polymers may be prepared by known batch or continuous polycondensation processes by substitution of the desired molar amount of Formula 1 species for the similarly reacting terminated monomer normally used to form the unmodified polycondensate. Those of ordinary skill in the art will recognize that the terminal functionality of the OSM need not be identical to the functionality of the replaced monomer so long as the polycondensation or transesterification reaction proceeds. For example, in the production of PET, terephthalic acid is often polymerized with ethylene glycol. In such instance, substitution of the desired molar equivalent amount of the dihydroxy terminated species of Formula 1 (i.e., substitution for an equivalent amount of ethylene glycol) in the polycondensation reaction would result in a modified polyester having some OSM segments in the copolymer at the expense of fewer ethylene segments. Applicants' preferred method for preparation of the oxygen scavenging copolycondensates is by reactive extrusion (transesterification) since it allows for greater flexibility at later stages in the overall scheme of production of oxygen scavenging bottles and/or packaging articles. Preparation of the copolymers of this invention by transesterification is disclosed in detail in a PCT application published on Mar. 26, 1996 having International Publication Number WO 98/12244.

Applicants have discovered that inclusion of a small amount of a chain extending or crosslinking agent in the transesterification process serves to increase the molecular weight, increase the intrinsic viscosity, and cause a corresponding elevation of the glass transition temperature of the oxygen scavenging copolymers formed by transesterification. Higher glass transition temperatures are of significance because the modified polymers exist as solids below the glass transition temperature and can be made into films and other packaging articles which retain their shape, etc. at ambient temperatures (i.e., about 0–60° C.). The modified polymers of this invention are able to scavenge oxygen at temperatures above and below their glass transition temperature. Applicants' preferred chain extending agent is pyromellitic dianhydride (PMDA) because it is readily commercially available, because it reacts quickly and substantially to completion, and because it is a listed and approved monomer by the United States Food and Drug Administration. The PMDA, when used, is deployed in the range of about 10 to 5,000 PPM with respect to the weight of the copolymer. In one embodiment, premixed concentrates of polyester and PMDA are used as part of the feed to the reactive extruder for formation of the copolymers by transesterification. These premixed concentrates typically are comprised mainly of polyester (such as PET or modified PET e.g., PET having some naphthalate or isophthalate monomer in it) and about 0.2 to about 15 wt % (based on total wt of the concentrate) of PMDA. The polyester in the concentrate may be entirely or partially recycle polyester and may further comprise sodium. A preferred embodiment involves the presence of sodium in the form of sodium carbonate. The sodium may be part of the pre-mix concentrate or may be added during formation of the oxygen scavenging modified polycondensate. Regardless of how it is added, the sodium should be present in the range of about 5–500 PPM of sodium with respect to the weight of the modified polycondensate. When the modified polycondensate is produced from a feed involving at least some recycle polyester (such as PET), it is to be noted that some sodium may already be present in the recycle polyester as it is a common practice to clean the recycle polyester with aqueous sodium hydroxide solution. It may be necessary to account for the presence of any residual sodium when using recycle polyester.

Substantial convenience and benefit may accrue by use pre-mixed concentrates as are disclosed in U.S. Pat. No. 5,340,846. One benefit is that the PMDA, when deployed (with or without sodium) in the reactive extrusion process, is reacted virtually to completion, i.e., less than about 100 PPM unreacted PMDA remains in the oxygen scavenging copolycondensate thus formed.

The oxygen scavenging copolymers of this invention may constitute the package in certain instance, especially for the packaging of non-comestible products. However, they are typically fabricated into bottles, packaging articles, or films wherein they are disposed as at least one of the layers in a multi-layered bottle wall, packaging article, or film construction. The modified polymers are normally deployed as at least one layer of a multi-layered construction in conjunction with another thermoplastic material, especially one or several selected from those as listed in USA 21 CFR § 177.1010–177.2910 (revised April, 1997 edition). Applicants' preferred multi-layered construction bottles may be produced on any modern bottle making equipment capable of handling at least two molten thermoplastic resins. Applicants' bottles and bottle preforms may also be produced in a manner which minimizes permanent deformation and distortion, e.g., as disclosed in U.S. Pat. No. 4,936,473 issued on Jun. 26, 1990 to Kirishnakumar et al. Bottles that resist permanent deformation resulting from pasteurization or hot filling are defined as those bottles which recover to their original dimensions (within 3%) after cooling to storage temperature following hot fill or removal from the heat of pasteurization. Especially important is the retention (or recovery) of the perpendicularity feature of a bottle following pasteurization or hot fill. Perpendicularity relates to measurement of plumbness (vertical stance) of a bottle standing on a flat and level surface.

An especially preferred type of package wall, bottle wall or film construction comprises a three layered embodiment as shown in FIG. 1. The outside of the bottle or package wall 24 is formed by a thicker layer 26 of unmodified packaging polycondensate and may be comprised of recycled material in whole or in part since it does not contact the package cavity or the packaged material. The inside of the bottle or package wall 22 which defines the package cavity is formed by a thinner layer 28 of unmodified packaging polycondensate. Generally, the thinner layer 28 is virgin polycondensate. The middle layer 30 is comprised of the oxygen scavenging copolycondensates of this invention, i.e., those having OSM segments. The middle layer may be diluted with unmodified polycondensate which may be virgin, recycle, or a mixture of both. The polycondensate segments on the oxygen scavenging modified polymer may be derived in whole or in part from recycled polycondensate. The middle layer typically further contains added transition metal catalyst, a photo-active substance, an anti-oxidant such as BHT and other routinely used additives.

Other and/or additional layers may also be present. For example, a bottle having the bottle wall construction of FIG. 1 could be further coated on the inside (package cavity) or outside to enhance the properties of the bottle. As an example, PPG Industries produces a series of water based epoxy-amine-acrylate (EAA) emulsions applied as a water borne spray to form an inner lining for polyester (such as PET) and other plastic containers sold under the trade name BAIROCCADE®. The application of such a layer serves to improve the passive barrier properties of polyester bottles not only for oxygen but also for retention of carbon dioxide in carbonated beverage bottles. The application of such a layer to either the inside or outside (most preferably the outside) of a bottle having a layer of oxygen scavenging modified polymer produces a bottle having both improved passive and active oxygen barrier properties as well as improved carbon dioxide barrier properties. A further benefit of such a coating is that a lesser amount of active oxygen scavenging material is needed for a given application because the improved passive oxygen barrier properties, when coated on the outside, serve to reduce the amount of oxygen which must be eliminated by the active oxygen scavenger layer.

It is also a common practice to coat polyester bottles with an $SiO_2$ layer, normally on the outside of the bottle, also with the purpose of improving passive gas barrier properties to both oxygen and carbon dioxide. As was the case above, the application of an $SiO_2$ layer to the outside of a bottle having a layer of oxygen scavenging copolymers produces a bottle having both improved passive and active oxygen barrier properties as well as improved carbon dioxide barrier properties. Also the $SiO_2$ coating requires less active oxygen scavenging material for a given application because the improved passive oxygen barrier properties serve to reduce the amount of oxygen which must be eliminated by the active oxygen scavenger layer. Also for either the EAA coating or the $SiO_2$ coating the shelf life of the unfilled bottle is extended because of reduced oxygen attack from the coated side of the bottle. In certain embodiments, coats of EM and/or $SiO_2$ could be applied to both the inside and outside of a bottle. The inside and outside coatings may be the same or may be comprised of each type. Coatings of EAA and/or $SiO_2$, however, serve to diminish the recycle quality of such coated bottles.

It is rather traditional to package beer in bottles having an amber or green colorant added to the packaging material(s) so as to improve the UV light protection of the beer container. The presence of colorant is also detrimental to the general purpose recycling of polyester (or even glass) bottles because the colored recycle polyester (or other material) may typically only be recycled into similarly colored bottles or lesser value streams.

In an especially preferred embodiment, applicants place the beer bottle colorant in an exposed layer only (usually the exterior coat). The exterior coat on the beer bottle having an active oxygen scavenging layer may be an EM coat, an $SiO_2$ coat, or some other coat which may serve no purpose other than as a vehicle for the colorant or some other additive. The active oxygen scavenging layer may comprise the copolymers of this invention or other oxygen scavenger systems such as a blend of polyester and polyxylenediamineadipamide. As a preliminary step in the recycle process, plastic beer bottles having colorant (and/or other additives) only in the outer layer are subjected to a process which selectively removes the colorant containing layer. The exposed unwanted layer may be removed by any suitable means including chemical (e.g. solvent), physical (e.g. abrasion), irradiation (e.g., to depolymerize or melt the layer), heat (e.g., to melt or decompose the layer), etc. so long as the process serves to selectively remove the undesired exposed coat thus leaving the remainder of the bottle as material more amenable for general recycle.

For food and beverages which require pasteurization, it is a common practice in the bottling industry to perform such pasteurization operations after filling the bottles (in-situ). In-situ pasteurization may involve bottles containing a carbonated beverage such as beer or a non-carbonated beverage such as orange juice. A preferred embodiment of Applicants' invention is a three layered construction as depicted in FIG. 1. Especially preferred is the embodiment of FIG. 1 wherein the inner and outer layers are polyester and the middle layer of oxygen scavenging modified polymer comprises predominantly polyester segments and an oxygen scavenging amount of OSM segments. Applicants have determined that three layered polyester bottles are more resistant to the heat of the pasteurization process when the polyester employed comprises some naphthalate segments as shown in Formula 2.

Formula 2

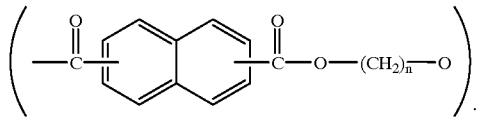

In Formula 2, n is an integer having a value of 2, 3, or 4. Generally the naphthalate segments are deployed in the range of 0.01 to 100 wt % of the polyester layer or layers. In the case of 100% naphthalate segments, generally the polyester employed would be polyethylene naphthalate. For usages of less than 100%, typically other non-naphthalate segments in the polyester would be comprised of PET and/or polyethylene isophthalate. One or both of the unmodified polyester layers may comprise the naphthalate segments. Also, the oxygen scavenging modified polymer of the middle layer may further comprise some naphthalate segments. Heat resistant bottles suitable for in-situ pasteurization and comprising Applicants' preferred three layer polyester construction may be produced, for example, as disclosed in U.S. Pat. No. 5,804,016 issued on Sep. 8, 1998 to Collette et al.

In an especially preferred embodiment, applicants produce an oxygen scavenging modified polymer by transition metal catalyzed transesterification comprising about 96 wt % PET (or modified PET having some naphthalate, isophthalate, etc.) and about 4 wt % unhydrogenated polybutadienediol oligomer. The molecular weight of the polybutadienediol oligomer is in the range of 100 to 10,000 and the transition metal polymerization catalyst is deployed in the range of 50 to 500 PPM with respect to the weight of the materials in the reactive extruder. PMDA in the range of 10–5,000 PPM (with respect to the weight of the materials in the extruder) may optionally be added to the reactive extruder. While the copolymer is still in the molten state, an additional 10–500 (preferably about 100) PPM of transition metal (preferably cobalt) catalyst (with respect to copolymer weight) is added and 10–300 (preferably about 100) PPM of benzophenone (with respect to copolymer weight) are added to the copolymer. This rather specific preferred embodiment oxygen scavenging copolymer formulation comprising about 96 wt % PET segments, about 4 wt % polybutadiene segments, 10–500 PPM transition metal catalyst, 100–300 PPM benzophenone, and optionally 10–5,000 PPM PMDA will subsequently be referred to as "S9604" in this application for the sake of convenience.

A thin film of S9604 when tested for oxygen scavenging capacity in air is able to absorb about 9 cc of oxygen at ambient temperatures in 100% relative humidity over a 28 day period (test condition). In many embodiments, S9604 is deployed as a middle layer in a three layered package film or bottle wall (see FIG. 1). Referring again to FIG. 1, the middle oxygen scavenging layer 30 typically comprises about 10 wt % of the bottle or film and is often placed off center further from the outside of the container 24 to provide more of a passive barrier to oxygen from air and closer to the inside of the container 22 to provide less of a barrier to head space oxygen in the package cavity which must reach the scavenger layer in order to be consumed/removed from the package. Typically, the outer layer 26 is in the range of 1.0 to 20 times thicker than the inner layer 28. The oxygen scavenging capacity of S9604 as a middle layer in a three layer construction is about the same as noted above for an S9604 film when the multi-layered construction is cut into pieces and tested in air as was done for S9604 film (test condition). However, when tested in situ, such as the middle layer of a three layered construction in a capped bottle, the oxygen scavenging capacity of S9604 may be diminished (in use test). Typically, the "in use" capacity of the three layer S9604 construction is about 30–40% of the "test" capacity.

While not intended to be bound by theory, the difference in effective oxygen scavenging behavior of S9604 is believed to relate to the lower availability of oxygen for the in use condition compared to the test condition. As a test specimen (either embedded or free standing S9604 film) oxygen can permeate to the S9604 material from either side. However, the in use state necessarily entails unidirectional permeation (from outside the container only once all head space oxygen is scavenged) and hence limits the oxygen available locally, governed, e.g., by such factors as total wall thickness permeation rates and low solubility of oxygen in PET. Again while not intended to be bound by theory, it is further believed that the oxygen scavenging mechanism of S9604 involves formation of hydroperoxide radicals which create free radicals that may end up participating in other unproductive reactions (instead of oxygen scavenging reactions) in an oxygen starved environment. Such a proposed mechanism of oxygen scavenging by S9604 provides an explanation for the reduced effectiveness of it in an oxygen starved environment since the excess free radicals participate in other reactions serving to make a portion of the polybutatdiene segments unavailable for scavenging oxygen. Applicants have discovered that the apparent tendency of S9604 excess free radicals to participate in unproductive reactions in an oxygen starved environment is ameliorated by addition of an oxidation moderator or controller which (it is further theorized) ties up and stabilizes excess free radicals so as to match free radical production with oxygen availability. It is also theorized that the stabilized free radicals subsequently combine to regenerate the oxygen scavenging moiety rather than consume polybutadiene segments as appears to be the case in the absence of an oxidation moderator or controller. Regardless of the reaction mechanism, Applicants have discovered that adding oxidation moderator or controller to the S9604 composition formulation serves to increase the oxygen scavenging capacity of S9604 as measured by in use (diminished oxygen) tests. The preferred oxidation moderator or controller is butylated hydroxy toluene (BHT) which is added in the range of about 10–2,000 PPM with respect to the weight of the oxygen scavenging modified polymer.

The S9604 formulation (with or without PMDA and with or without an oxidation moderator or controller) represents a compromise which produces satisfactory results for each of the desirable characteristics as recited for Nos. 1 through 5 above. Passive gas barrier properties (No. 6 above) are improved by coating the packaging article (such as a bottle) having a layer of S9604 with EAA or $SiO_2$ as was previously disclosed. Improved passive barrier properties are desirable because they help to keep oxygen out of the package cavity and also because they help to retain $CO_2$ within the package cavity for beer and other carbonated beverages. While additional layers improve the passive barrier properties of the packaging article, post polymerization treatment and processes are also used which improve the passive barrier and other salient properties of the S9604 itself. More generally, the properties of most oxygen sensitive polymers could be improved by post polymerization treatment when performed substantially in the absence of oxygen as is disclosed in this invention for treatment of oxygen scavenging copolymers.

The disclosed post treatment of S9604 also improves (raises) the IV, raises the glass transition temperature, dries, removes volatile components, increases the crystallinity, and further polymerizes (usually by solid state polymerization) the S9604 copolymer. The post treatments must be performed in a manner which does not significantly reduce the oxygen scavenging performance nor the clarity of the oxygen scavenging copolymer. A preferred method of performing and completing the post treatment is through careful vacuum drying and optionally heating. The thermoplastic pelletized oxygen scavenging copolymer is placed in a vacuum oven capable of obtaining a vacuum of at least 1 mm of mercury. Those of ordinary technical skill will appreciate that values lower than 1 mm of mercury implies a better (more perfect) vacuum. After at least 15 minutes under vacuum at room temperature, the oven is slowly heated over a 1 to 3 hour period under vacuum to 160° C. and is maintained at that temperature under vacuum for at least two hours to crystallize the product. The heat is turned off and the oven is allowed to cool to reach 60° C. When the temperature reaches 60° C., the vacuum is broken by introduction of nitrogen gas. The product is quickly removed and packed into foil bags which are heat sealed. The product and the foil bags are maintained under a nitrogen blanket during these operations. Generally it is a minimum requirement to hold the thermoplastic at a temperature of at least 60° C. for a period of at least one hour under a vacuum of at least 1 mm of mercury in order to realize any benefit of post polymerization treatment. The one hour period may comprise a single treatment of at least one hour or may comprise several treatments totaling at least one hour.

For even further solid state polymerization operations, temperatures above 160° C. are used, more typically around 200° C. An appreciation in IV of about 0.01 dl/g per hour is obtained at 200° C. under vacuum. For drying or devolatizing operations, temperatures below 160° C. under vacuum are typically employed. The critical point is to substantially avoid the presence of oxygen at elevated temperature both during and after any of these operations. For this application, substantially in the absence of oxygen will be defined as the amount of oxygen present under vacuum of 1 mm of mercury for vacuum operations or the amount of oxygen present in 99% pure nitrogen (or other inert gas) for operations conducted under a blanket of nitrogen. Applicants have also found that post polymerization processes may be performed with less loss of oxygen scavenging capacity by adding an oxidation moderator or controller in the amount of 10–2,000 PPM with respect to the weight of the oxygen scavenging modified polymer. The preferred oxidation moderator (anti-oxidant) is BHT.

EXAMPLES 1–2

Examples 1 and 2 will serve to demonstrate that S9604 has been successfully post polymerization treated with substantially no reduction in oxygen scavenging capacity of the copolymer composition. The oxygen scavenging copolymer used for Examples 1 and 2 was prepared by reactive extrusion (transesterification) in the manner as described below. A ZSK-30 extruder was equipped with a loss-in-weight PET pellet feeder under a 99.9% pure nitrogen blanket. The hydroxy terminated polybutadiene was maintained in a viscous fluid vessel from which it was separately conveyed via a positive displacement pump to a port on the extruder line. PET (Shell Tray Tuf® 1006) was extruded at a feed rate of about 8 pounds (3.63 Kg) per hour affording a residence time of approximately 4 minutes while maintaining the extruder temperature in the range of 260 to 270° C. The hydroxy terminated polybutadiene (Elf Atochem RLM20, - MW of 1230) was pumped to the extruder so as to achieve a level of 4 wt % in the extruder mixing zone. Cobalt in the form of cobalt octoate (Hulls Nuodex® D.M.R. cobalt 6%) was used as the transesterification catalyst and was added to the extruder mixing zone so as to afford 100 PPM cobalt with respect to the weight of the material in the extruder. Melt seal designs were used to affect a vacuum zone following the mixing zone prior to the die opening. The extrudate was dry and non-smoking, and was easily pelletized after cooling on a metal belt. No additional cobalt octoate, no PMDA, no sodium, and no benzophenone were added to the copolymer during formation in the extruder or at a later time. The copolymer was extruded, chopped/pelletized, and then sealed into foil bags all under a nitrogen blanket.

Figure 2:
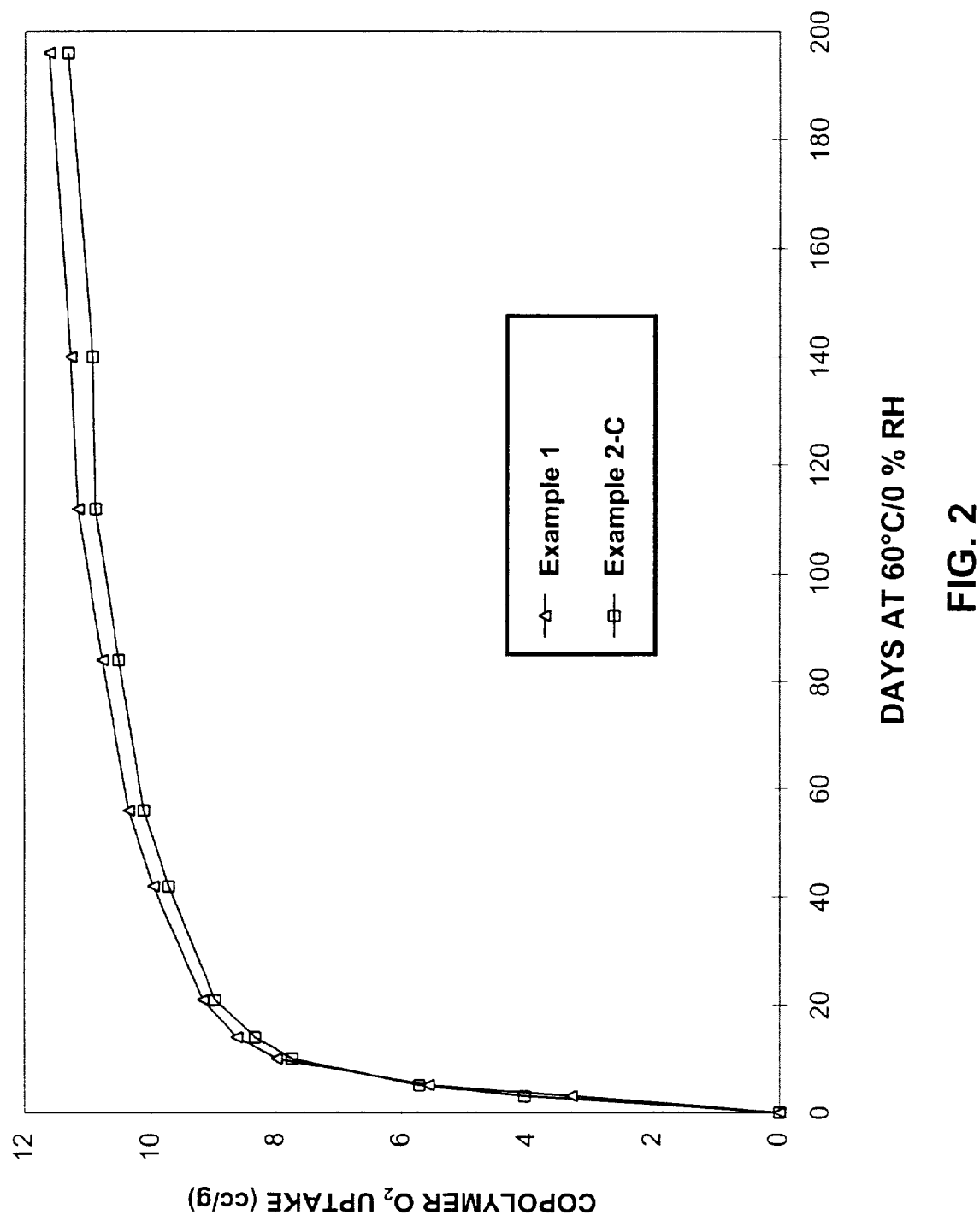
FIG. 2. is a chart which shows that post polymerization treatment of oxygen scavenger copolymers has not substantially diminished their oxygen scavenging capacity.

For Example 1 (the control example) the polymer pellets prepared as described above were made into a film of about 0.01–0.02 cm thick. The film was cut into pieces and tested for oxygen uptake by placing known amounts of the film in 500 cc containers filled with 0% relative humidity air and then sealed off and maintained at 60° C. The amount of oxygen in the air sealed in with the sample was monitored with a Mocon HS750 analyzer unit over a period of time by withdrawal of small samples (1–3 ml) over a period of time through a rubber septum in the 500 cc container. The amount of oxygen scavenged per unit weight by the copolymer film sample was easily calculated based on remaining oxygen content of the sealed air sample and known weight of the copolymer present in the 500 cc container. The results are shown graphically in FIG. 2.

For Example 2, pellets of the copolymer prepared as recited above were taken from the sealed foil bags and placed in a vacuum oven under a 99.9% pure nitrogen blanket. The pellets were subjected to 0.5 mm of mercury vacuum at room temperature for one hour and then slowly heated during a 2–3 hour period to the temperature as indicated in Table 1 while under vacuum. The heat was turned off and the oven was allowed to cool to reach 60° C. When the temperature reached 60° C., the vacuum was broken by introduction of nitrogen gas. The treated copolymer was quickly removed and packed into foil bags which were heat sealed. The product and the foil bags were maintained under a nitrogen blanket during these operations. The intrinsic viscosity (IV) of each sample was measured and compared to that of Example 1 The IV measurements were made by the technique of inherent viscosity of polyesters and polyamides based on ASTM method D2857 and the solvent used was a 60/40 blend of phenol/ 1,1,2,2-tetrachloroethane.

TABLE 1

| Example No. | Treatment Time/Temp. | IV |
|---|---|---|
| 1 | None | 0.57 |
| 2-A | 40 hrs/150° C. | 0.55 |
| 2-B | 28 hrs/130° C. | 0.56 |
| 2-C | 24 hrs/200° C. | 0.68 |
| 2-D | 24 hrs/240° C. | 0.71 |

The IV was measured as an indication of further/additional polymerization (solid state polymerization) and was noticeably increased for heat treatments over 150° C. Some of the material produced by the heat treatment of Example 2-C was heated and made into films of about 0.01–0.02 cm thick. The film was cut into pieces and tested for oxygen uptake in the manner given above for Example 1. The results for Example 2-C are shown graphically in FIG. 2 together with the results from Example 1 (control). It is obvious from FIG. 2 that the post polymerization treatment of Example 2-C has been performed in a manner so that the oxygen scavenging capacity is substantially the same as the untreated control copolymer of Example 1.

While the examples above describe preferred embodiments of this invention, it is to be understood that the invention is not limited to these precise embodiments, and that changes may be made therein without departing from the scope of the invention which is defined in the appended claims.

We claim:

1. A process for improving the properties of an oxygen scavenging modified polycondensate consisting essentially of (A) predominantly polycondensate segments selected from the group consisting of polyesters as recited in USA 21 CFR 177.1590 and polyamides and (B) a minor amount of oxygen scavenging moiety segments selected from the group consisting of polybutadiene monomer, unhydrogenated polybutadiene oligomers, polypropylene oxide oligomers and methyl pendant aromatic compounds by subjecting said modified polycondensate to post polymerization treatment substantially in the absence of oxygen for a time period totaling at least one hour.

2. The process of claim 1 wherein the post polymerization treatment comprises subjecting the oxygen sensitive polymer to vacuum no greater than 1 mm of mercury for a time period totaling at least one hour.

3. The process of claim 1 wherein the post polymerization treatment comprises heating the oxygen sensitive polymer to a temperature of at least 60° C. for a time period totaling at least one hour.

4. The process of claim 1 wherein the oxygen scavenging moiety segments comprise about 0.5–12 weight percent of the oxygen scavenging modified polycondensate.

5. A composition made by the process of subjecting an oxygen scavenging modified polycondensate consisting of (A) predominantly polycondensate segments selected from the group consisting of polyesters as recited in USA 21 CFR 177.1590 and polyamides and (B) a minor amount of oxygen scavenging moiety segments selected from the group consisting of polybutadiene monomer, unhydrogenated polybutadiene oligomers, polypropylene oxide oligomers and methyl pendant aromatic compounds to post polymerization treatment substantially in the absence of oxygen for a time period totaling at least one hour and wherein said composition further comprises enhancing material selected from the group consisting of pyromellitic dianhydride, transition metal catalysts, photoactive substances, oxidation moderators, and combinations of the preceding.

6. The composition of claim 5 wherein the transition metal catalyst comprises cobalt derived from cobalt carboxylate.

7. The composition of claim 5 wherein the photoactive substance comprises benzophenone.

8. The composition of claim 5 wherein the oxidation moderator comprises BHT.

9. A packaging article comprising the composition of claim 5.

10. The packaging article of claim 9 which recovers to within 3% of its original dimensions, including perpendicularity, after in-situ pasteurization of a carbonated beverage at temperatures up to 70° C.

* * * * *